US005148518A

United States Patent [19]

Inoue

[11] Patent Number: 5,148,518

[45] Date of Patent: Sep. 15, 1992

[54] COMPUTER SYSTEM WITH MONOCHROME DISPLAY UNIT CAPABLE OF CONVERTING COLOR CODE TO GRADATION CODE

[75] Inventor: Akifumi Inoue, Fussa, Japan

[73] Assignee: Kabushiki Kaisha Toshiba, Kawasaki, Japan

[21] Appl. No.: 675,112

[22] Filed: Mar. 25, 1991

Related U.S. Application Data

[63] Continuation of Ser. No. 262,641, Oct. 26, 1988, abandoned.

[30] Foreign Application Priority Data

Oct. 31, 1987 [JP] Japan ................................ 62-276023

[51] Int. Cl.⁵ ................................ G06F 15/20

[52] U.S. Cl. ................................ 395/131

[58] Field of Search ................ 364/518, 521; 340/703, 340/721, 723, 750, 798–800; 395/128–131

[56] References Cited

U.S. PATENT DOCUMENTS

| | | | |
|---|---|---|---|
| 4,564,915 | 1/1986 | Evans et al. | 364/521 |
| 4,725,833 | 2/1988 | Nakamura | 340/703 X |
| 4,739,312 | 4/1988 | Oudshoorn et al. | 340/703 |
| 4,739,313 | 4/1988 | Oudshoorn et al. | 340/703 |
| 4,800,380 | 1/1989 | Lowenthal et al. | 340/703 X |
| 4,823,120 | 4/1989 | Thompson et al. | 340/703 |

*Primary Examiner*—Heather R. Herndon
*Attorney, Agent, or Firm*—Finnegan, Henderson, Farabow, Garrett and Dunner

[57] ABSTRACT

A circuit for converting a color code to a gradation code includes a detector for detecting the number of color codes to used in display of one frame from a series of input color codes, a gradation code assigning unit for assigning gradation codes having substantially the same gray level differences to the color codes to be used in accordance with the detected number of color codes, and a gradation code output unit for outputting, in accordance with each of the input color codes, a gradation code assigned to the color code. The gradation has n levels. If the number of color codes to be used is m ($m<n$), gradation codes to be assigned are generated by k-bit rotating numerals assigned to the color codes to be used. k satisfies a relation of $m\times 2^k \leqq n < m\times 2^{k+1}$.

31 Claims, 7 Drawing Sheets

| | G3 | G2 | G1 | G0 | ASSIGNED DATA | | | | 1-BIT ROTATED DATA | | | | | 2-BIT ROTATED DATA | | | | |
|---|---|---|---|---|---|---|---|---|---|---|---|---|---|---|---|---|---|---|
| 15 | 1 | 1 | 1 | 1 | 1 | 1 | 1 | 1 | 1 | 1 | 1 | 1 | 15 | 1 | 1 | 1 | 1 | 15 |
| 14 | 1 | 1 | 1 | 0 | 1 | 1 | 1 | 0 | 1 | 1 | 0 | 1 | 13 | 1 | 0 | 1 | 1 | 11 |
| 13 | 1 | 1 | 0 | 1 | 1 | 1 | 0 | 1 | 1 | 0 | 1 | 1 | 11 | 0 | 1 | 1 | 1 | 7 |
| 12 | 1 | 1 | 0 | 0 | 1 | 1 | 0 | 0 | 1 | 0 | 0 | 1 | 9 | 0 | 0 | 1 | 1 | 3 |
| 11 | 1 | 0 | 1 | 1 | 1 | 0 | 1 | 1 | 0 | 1 | 1 | 1 | 7 | 1 | 1 | 1 | 0 | |
| 10 | 1 | 0 | 1 | 0 | 1 | 0 | 1 | 0 | 0 | 1 | 0 | 1 | 5 | 1 | 0 | 1 | 0 | |
| 9 | 1 | 0 | 0 | 1 | 1 | 0 | 0 | 1 | 0 | 0 | 1 | 1 | 3 | 0 | 1 | 1 | 0 | |
| 8 | 1 | 0 | 0 | 0 | 1 | 0 | 0 | 0 | 0 | 0 | 0 | 1 | 1 | 0 | 0 | 1 | 0 | |
| 7 | 0 | 1 | 1 | 1 | 0 | 1 | 1 | 1 | 1 | 1 | 1 | 0 | | 1 | 1 | 0 | 1 | |
| 6 | 0 | 1 | 1 | 0 | 0 | 1 | 1 | 0 | 1 | 1 | 0 | 0 | | 1 | 0 | 0 | 1 | |
| 5 | 0 | 1 | 0 | 1 | 0 | 1 | 0 | 1 | 1 | 0 | 1 | 0 | | 0 | 1 | 0 | 1 | |
| 4 | 0 | 1 | 0 | 0 | 0 | 1 | 0 | 0 | 1 | 0 | 0 | 0 | | 0 | 0 | 0 | 1 | |
| 3 | 0 | 0 | 1 | 1 | 0 | 0 | 1 | 1 | 0 | 1 | 1 | 0 | | 1 | 1 | 0 | 0 | |
| 2 | 0 | 0 | 1 | 0 | 0 | 0 | 1 | 0 | 0 | 1 | 0 | 0 | | 1 | 0 | 0 | 0 | |
| 1 | 0 | 0 | 0 | 1 | 0 | 0 | 0 | 1 | 0 | 0 | 1 | 0 | | 0 | 1 | 0 | 0 | |
| 0 | 0 | 0 | 0 | 0 | 0 | 0 | 0 | 0 | 0 | 0 | 0 | 0 | 0 | 0 | 0 | 0 | 0 | 0 |

FIG. 3

| COLOR | | COLOR CODE | | G3 G2 G1 G0 |
|---|---|---|---|---|
| INTENSITY WHITE | 15 | 1 1 1 1 | | |
| YELLOW | 14 | 1 1 1 0 | → | 1 1 1 1 (15) |
| LIGHT MAGENTA | 13 | 1 1 0 1 | → | 1 0 1 1 (11) |
| LIGHT RED | 12 | 1 1 0 0 | | |
| LIGHT CYAN | 11 | 1 0 1 1 | | |
| LIGHT GREEN | 10 | 1 0 1 0 | | |
| LIGHT BLUE | 9 | 1 0 0 1 | | |
| DARK GRAY | 8 | 1 0 0 0 | | |
| WHITE | 7 | 0 1 1 1 | | |
| BROWN | 6 | 0 1 1 0 | | |
| MAGENTA | 5 | 0 1 0 1 | | |
| RED | 4 | 0 1 0 0 | | |
| CYAN | 3 | 0 0 1 1 | | |
| GREEN | 2 | 0 0 1 0 | → | 0 1 1 1 (7) |
| BLUE | 1 | 0 0 0 1 | | |
| BLACK | 0 | 0 0 0 0 | → | 0 0 0 0 (0) |

FIG. 9

COMPUTER SYSTEM WITH MONOCHROME DISPLAY UNIT CAPABLE OF CONVERTING COLOR CODE TO GRADATION CODE

This application is a continuation of application Ser. No. 262,641, filed Oct. 26, 1988, now abandoned.

BACKGROUND OF THE INVENTION

1. Field of the Invention

The present invention relates to a computer system with a monochrome display unit capable of converting a color code to a gradation code.

2. Description of the Related Art

Recently, a flat panel display such as an LCD (Liquid Crystal Display) or a PDP (Plasma Display Panel) has been used as a display unit of a portable computer system. However, many of application software used in the portable computer system are made for a color CRT. Therefore, if an image is directly displayed on a flat panel display capable of displaying only a monochrome image, colors cannot be discriminated from each other.

For this reason, a pseudo gradation method in which one dot is displayed using a plurality of dots or a method of displaying on a flat panel display with gradation are conventionally used. However, in the former method, a flat panel display must have a number of dots several times that of dots to be displayed. In the latter method, if gradation display is performed by 16 gray levels, adjacent gray levels cannot be discriminated, and the lightest display cannot be seen. To the contrary, if the number of gray levels is limited, a plurality of colors must be assigned to one gray level. As a result, colors cannot be discriminated from each other.

SUMMARY OF THE INVENTION

The present invention has been developed in consideration of the above situation and has as its object to provide a computer system capable of converting color codes to gradation codes having substantially the same gray level differences.

The computer system comprises memory for storing color codes of display data for one frame of a picture, assigning section for assigning gradation codes to the color codes, respectively, detector for detecting the number of colors to be used to display one frame, changing section for changing the graduation codes, in accordance with the number of colors detected by the detector, to display gradation codes which have substantially the same difference in gradation level among themselves, and monochrome display unit for displaying the frame of a picture in accordance with the display gradation codes. The gradation levels are n, and if the number of color codes to be used is m (m<n), gradation codes to be assigned are generated by k-bit rotating the numeral assigned to the color codes. In this case, k satisfies a relation of $m\times 2^k<n<m\times 2^{k+1}$.

A method of converting a color code to a gradation code comprises: detecting the number of color codes Lo be used in display of one frame from a series of color codes; and assigning gradation codes having substantially the same gray level differences to the color codes to be used in accordance with the detected number of color codes.

As described above according to the present invention, adjacent color codes can be automatically converted to gradation codes having constant intervals. In addition, a problem in which display is converted to a pale gradation code and therefore cannot be seen can be automatically prevented. Therefore, the present invention is effective especially when the number of colors to be used in display is small.

BRIEF DESCRIPTION OF THE DRAWINGS

FIG. 3 is a table for explaining a principle of the present invention;

FIG. 9 is a table showing a relationship between color codes and colors; and

DETAILED DESCRIPTION OF THE PREFERRED EMBODIMENTS

A computer system according to the present invention will be described below with reference to the accompanying drawings.

Figure 1:
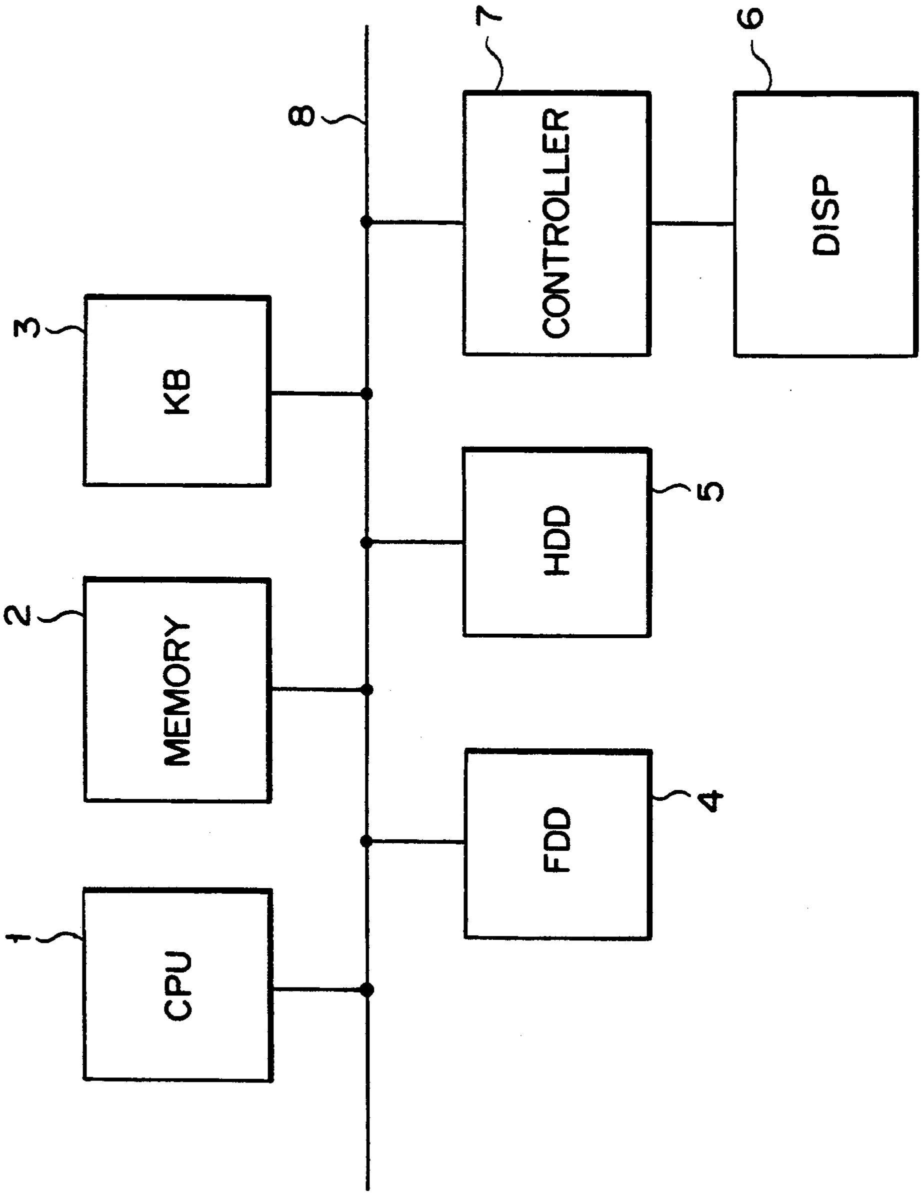
FIG. 1 is a block diagram showing an arrangement of an embodiment of a computer system according to the present invention.

At first, the configuration of the embodiment of the computer system will be described with reference to FIG. 1. CPU 1 control the overall system and memory 2 stores a program for controlling CPU 1 and display data. Keyboard 3 is operated by operator to input data or commands. Floppy disk drive (FDD) 4 and hard disk drive (HDD) 5 store a program and data. Monochrome display 6 displays data under control of controller 7 which includes a color converting circuit. To system bus 8, CPU 1, memory 2, keyboard 3, FDD 4, HDD 5, and controller 7 are connected.

Figure 2:
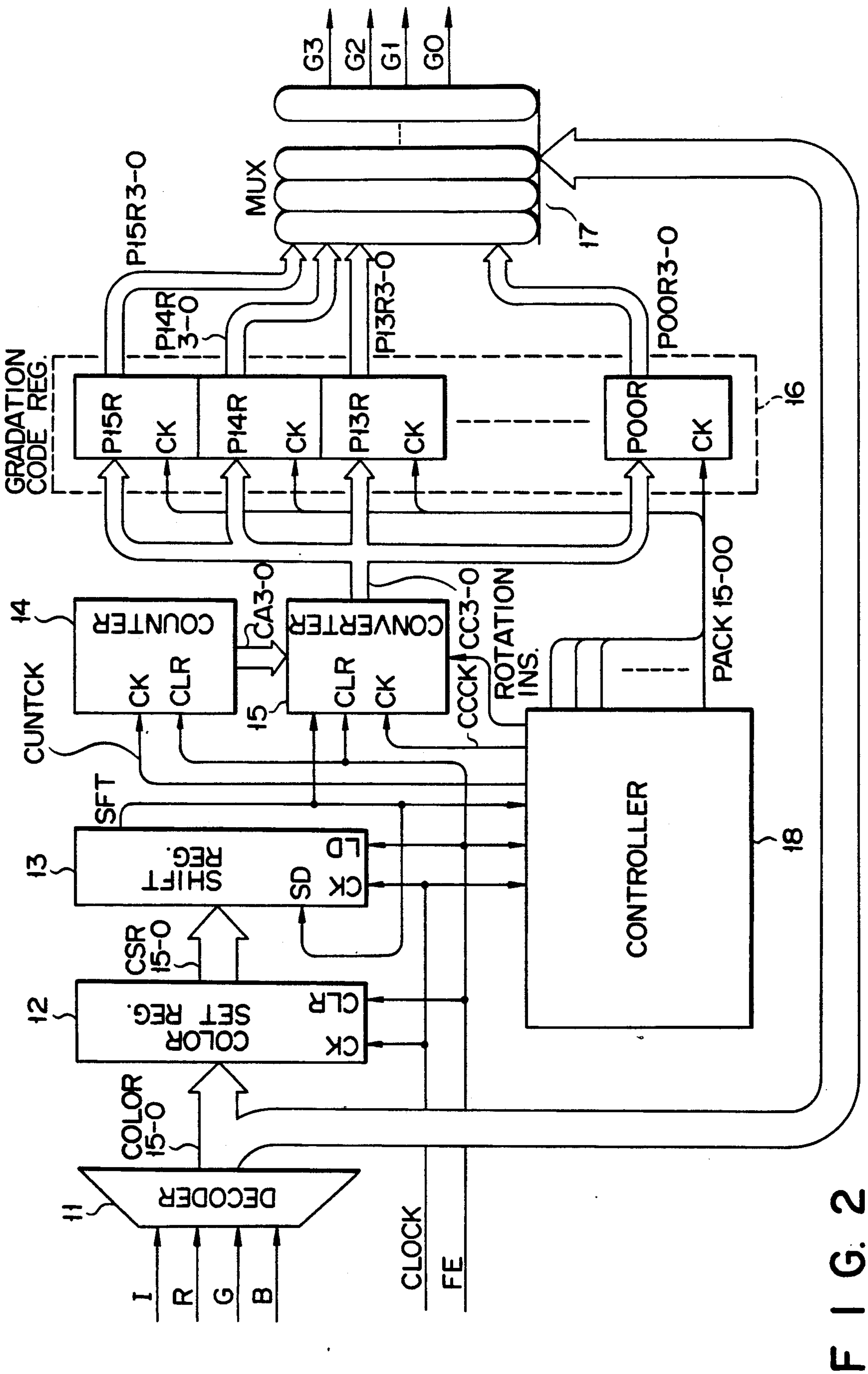
FIG. 2 is a block diagram showing an arrangement of a first embodiment of a color converting circuit of the controller showing in FIG. 1.

Referring to FIG. 2, an arrangement of a first embodiment of the color converting circuit will be described.

In FIG. 2, decoder 11 decodes a color code which is readout from memory 2 by controller 7 and is supplied to the converting circuit in units of pixels, and generates color data COLOR15-0. The color code includes I, R, G, and B and can designate 16 colors shown in FIG. 9. Color set register 12 is a 16-bit register and latches color data to be used in display of one frame from data COLOR15-0 in units of bits in synchronism with a clock signal CLOCK. The latched data is output to shift register 13 as data CSR15-0. Register 12 is reset in accordance with frame end signal FE representing an end of one frame.

Register 13 loads data CSR in accordance with signal FE, i.e., after the color data to be used in display of one frame is set in register 12. Register 13 outputs loaded data CSR15-0 in accordance with signal CLOCK sequentially from the MSB (most significant bit) as data SFT in a bit serial manner. Data SFT is input to register 13 again.

Controller 18 receives signals CLOCK and FE and data SFT from register 13 and obtains the number of color data and colors to be used in display of one frame. In accordance with the obtained data, controller 18 generates signals CUNTCK and CCCK and a rotation instruction, and outputs signal CUNTCK to color counter 14 and signal CCCK and the rotation instruction to gradation code converter 15. Controller 18 also generates signal PACK15-00.

Counter 14 is preset to be 15 (=1111) in accordance with signal FE. Counter 14 counts down in accordance with signal CUNTCK and outputs the count to converter 15 as data CA3-0. Converter 15 receives data CA3-0 output from counter 14 in accordance with signal CCCK and rotates the received data in the MSB direction in accordance with the rotation instruction output from controller 18. A gradation code obtained in this manner is selectively stored in register PiR (i=0 to 15) of register 16 in accordance with signal PACK15-00 from controller 18.

Output PiR3-0 from each register PiR is output to multiplexer 17. Multiplexer 17 selects one of data PiR03-00 from registers PiR in accordance with data COLOR15-0 and outputs the data as gradation codes GO, G1 G2, and G3.

A principle of the present invention will be described below with reference to FIG. 3.

As shown in FIG. 3, if, for example, assigned data 14 (=1110) is rotated in the MSB direction by one bit, 13 (=1101) is obtained. When data 13 (=1101) is rotated in the MSB direction by one bit, 11 (=1011) is obtained. In this manner, when data 15 (=1111) to data 8 (=1000) are rotated in the MSB direction by one bit, data 15, 13, 11, 9, 7, 5, 3, and 1, i.e., data having intervals of 2 therebetween are obtained. Although not shown, when data 0 (=0000) to 7 (=0111) are rotated in the MSB direction by one bit, data 0, 2, 4, 6, 8, 10, 12, and 14 are obtained.

When data 15 (=1111) to data 12 (=1100) are rotated in the MSB direction by two bits, they are converted to data 15, 11, 7, and 3, i.e., data having intervals of 4 therebetween. Similarly, although not shown, when data 0 (=0000) to 3 (=0011) are rotated in the MSB direction by two bits, data 0, 4, 8, and 12 are obtained.

In this manner, when data are k-bit rotated, data having intervals of $2^k$ therebetween can be obtained. The present invention uses this principle and converts a color code to a gradation code.

An operation of the first embodiment utilizing the above principle will be described below. Assume that color data COLOR 14, 13, 02, and 00 are used in display of one frame.

Figure 4:
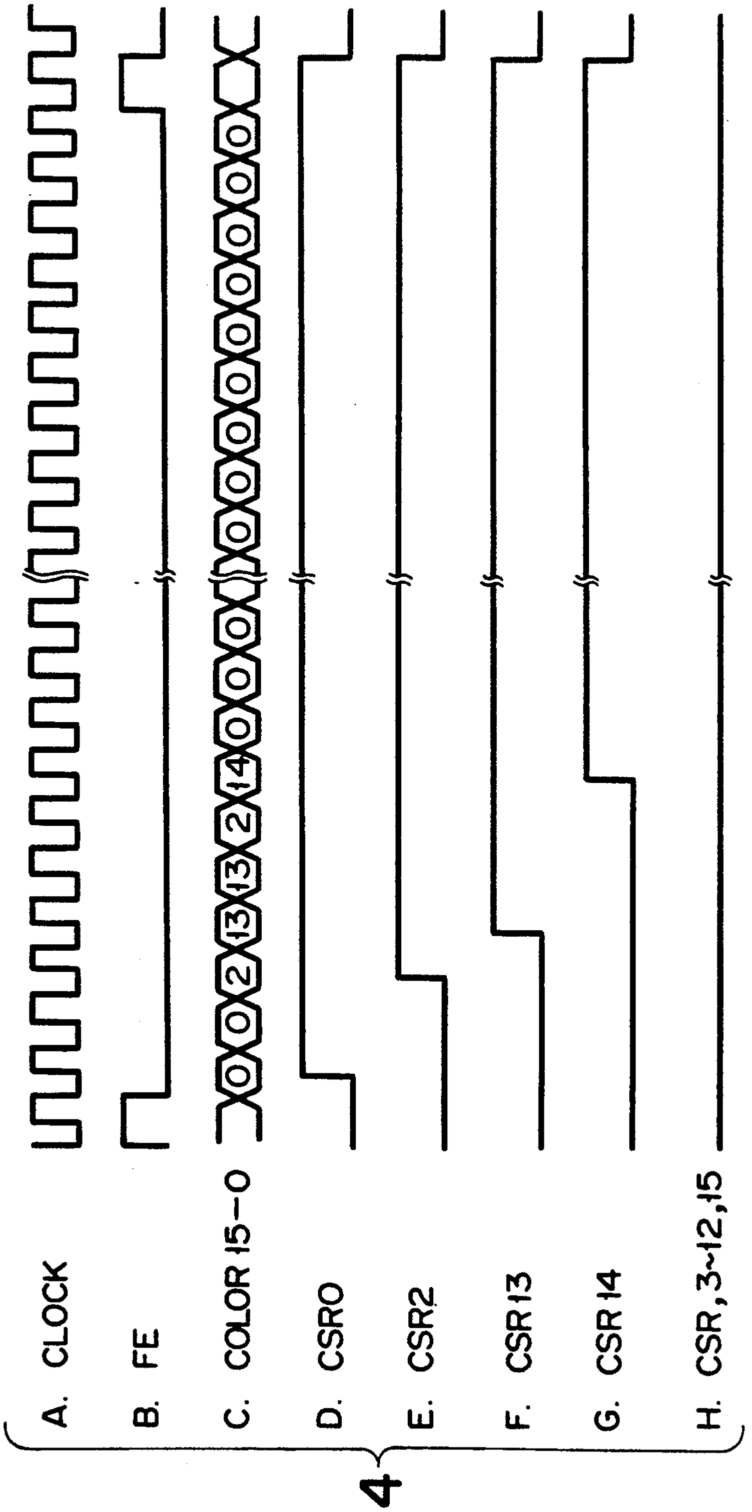
FIGS. 4A to 4H are timing charts showing timings of color set.

A series of color codes I, R, G, and B are read out from memory 2 and are supplied to decoder 11 in units of pixels. As shown in FIG. 4C, decoder 11 decodes the color codes in accordance with clock signal CLOCK and outputs color data COLOR15-0 to register 12 and multiplexer 17. As shown in FIGS. 4D to 4H, register 12 latches in units of bits data COLOR15-0 sequentially supplied in synchronism with signal CLOCK between frame end signals FE generated each time one frame is scanned, and outputs signal CSR15-0. That is, each bit in register 13 is set when first color data is input and holds the set data until it is reset by next signal FE. In this manner, color data to be used in display of one frame are latched in register 12. Since data COLOR 14, 13, 02, and 00 are used in display of one frame, data CSR 14, 13, 02, and 00 are set.

Figure 5:
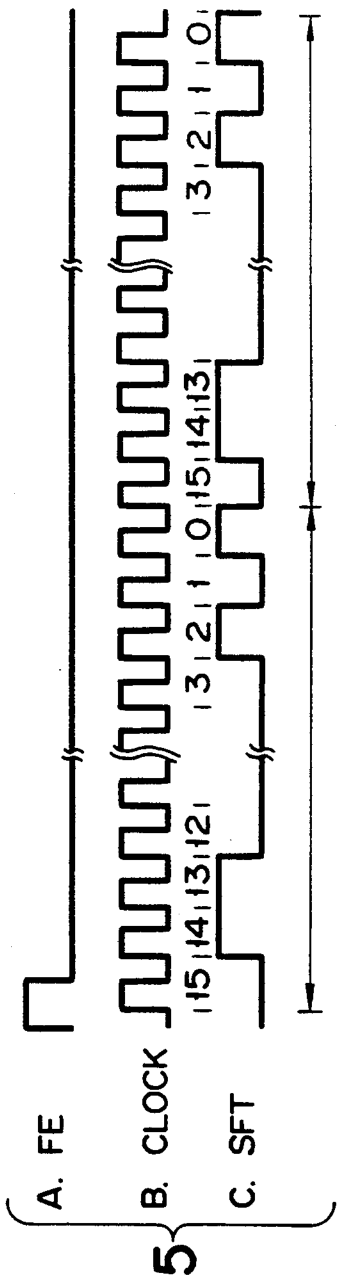
FIGS. 5A to 5C are timing charts showing timings of serial conversion.

Shift register 13 loads data CSR15-0 in accordance with signal FE and outputs loaded data CSR15-00 from the MSB in a bit serial manner as data SFT in accordance with signal CLOCK, as shown in FIG. 5C. At this time, CSR14, 13, 02, and 00 are set at logic 1. Register 13 repeatedly performs similar processing until next data CSR15-00 is loaded in accordance with signal FE. Data SFT is output to controller 18 and converter 15 and at the same time fed back to itself as a serial input.

Controller 18 detects colors and the number of colors to be used in display of one frame in accordance with signal SFT. In accordance with the detected number of colors, controller 18 outputs a rotation instruction representing the number of bits of rotation to converter 15. In addition, in accordance with signals CLOCK and FE, controller 18 generates and outputs signal CUNTCK to counter 14 and signal CCCK to converter 15.

Figure 6:
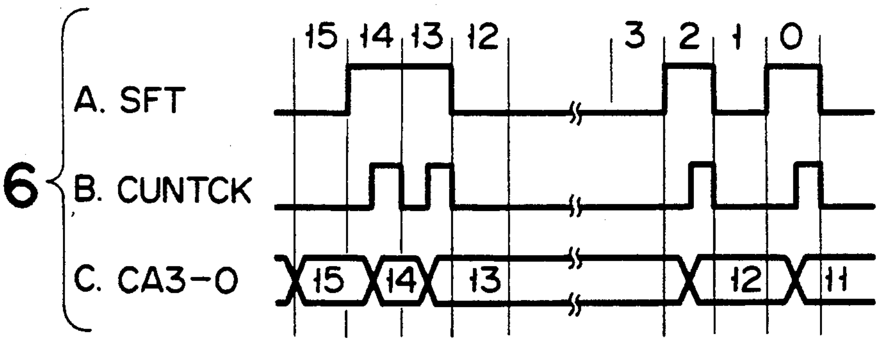
FIGS. 6A to 6C are timing charts showing timings of a color counter.

Counter 14 is preset to be 15 (=1111) in accordance with signal FE and counts down in accordance with signal CUNTCK from controller 18. When signals COLOR 14, 13, 02, and 00 are used, counter 14 outputs 15 (=1111), 14 (=1110), 13 (=1101), and 12 (=1100) accordingly as shown in FIG. 6C. Counter 14 is reset by signal FE. In this manner, counts are sequentially output.

Figure 7:
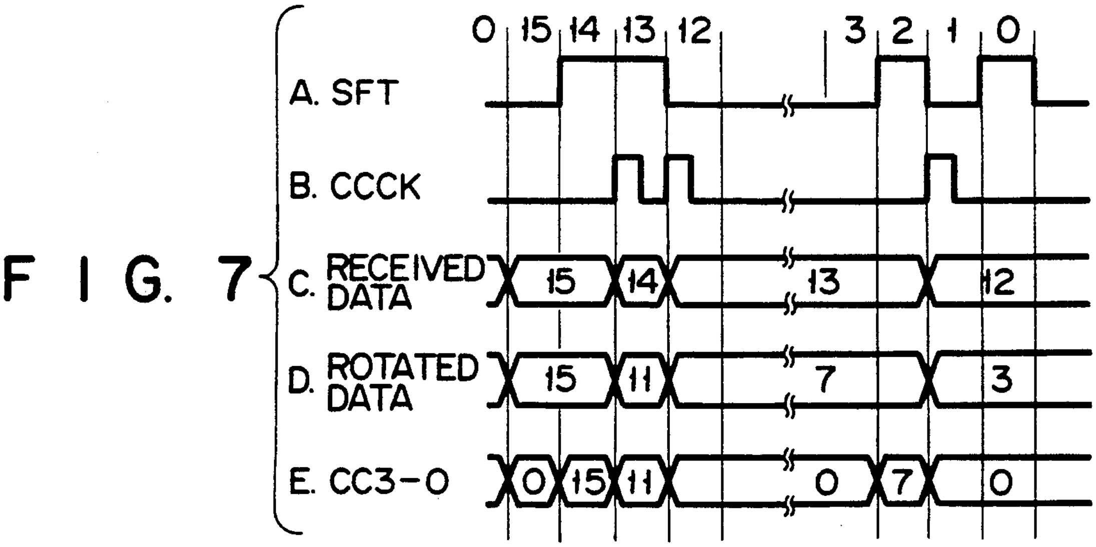
FIGS. 7A to 7E are timing charts showing timings of code converter.
Figure 8:
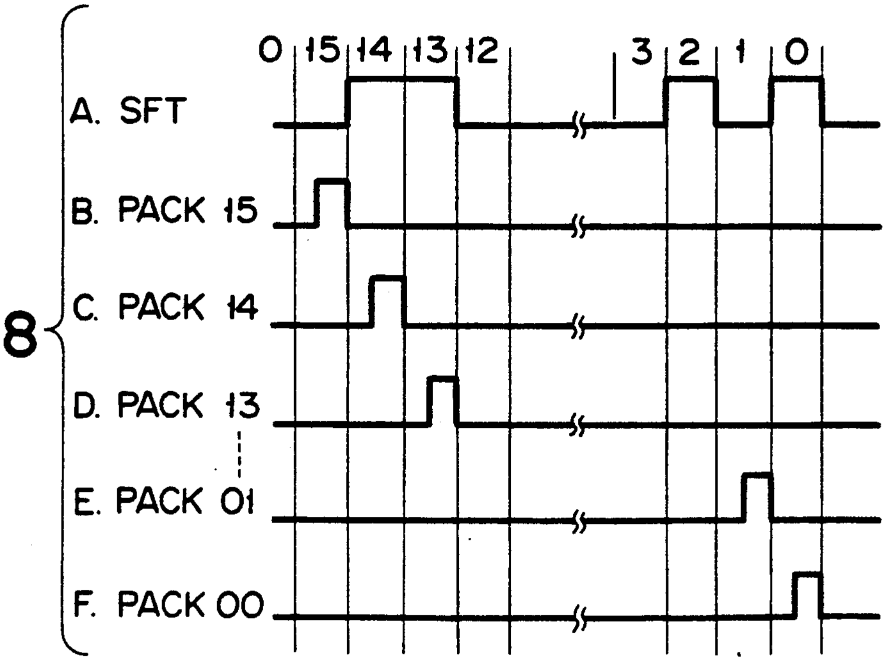
FIGS. 8A to 8F are timing charts showing timings of a palette clock.

As shown in FIG. 7C, converter 15 receives data 15 in accordance with signal FE and then receives data CA03-00 from counter 14 in accordance with signal CCCK output from controller 18. The received data are rotated in the MSB direction as shown in FIG. 3 in accordance with the rotation instruction from controller 18. In this case, the number m of colors used in display is three except for black (0000), i.e., $2<m\leqq 4$. Therefore, each data CA03-00 is 2-bit rotated. If number m of colors to be used is $4<m\leqq 8$, the data is 1-bit rotated. If $8<m\leqq 15$, no rotation is performed. For example, when data 15 (=1111), 14 (=1110), 13 (=1101), and 12 (=1100) as data CA03-00 are 2-bit rotated, data 15 (=1111), 11 (=1011), 7 (=0111), and 3 (=0011) are obtained as shown in FIG. 7D. Of these data, data 15 (=1111), 11 (=1011), and 7 (=0111) are output as gradation code CC3-0 to gradation code register 16 in accordance with signal SFT as shown in FIG. 7E. These data are stored in registers P14R, P13R, P02R of register 16 in accordance with signals PACK14, PACK13, and PACK02 from controller 18 shown in FIGS. 8B to 8F. However, data 3 (=0011) corresponding to black is fixed to 0 (=0000) in this embodiment and therefore is not output. As a result, color codes 14, 13, 02, and 00 are converted to gradation codes 15, 11, 07, and 00, as shown in FIG. 9.

As described above with reference to FIG. 3, if the number of colors to be displayed is 2 or less, data are 3-bit rotated because $8\ (=16\div 2)=2^3$, if it is 4 or less, they are 2-bit rotated because $4\ (=16\div 4)=2^2$, and if it is 8 or less, they are 1-bit rotated because $2\ (=16\div 8)=2^1$. In this manner, in accordance with the number of colors to be used in display, suitable gray level differences are provided between the colors.

Registers PiR (i=1 to 16) of register 16 output the stored gradation codes to multiplexer 17. Multiplexer 17 selects the gradation codes in accordance with data COLOR15-0 and outputs the selected gradation codes as data G0, G1, G2, and G3. At this time, each register PiR holds current gradation code until the next gradation code is input.

Note that in the above embodiment, counter 14 is preset to be "15" in accordance with signal FE and then counted down only once. However, controller 18 may output a signal to terminals CLR of counter 14 and converter 15 every 16 bits.

In addition, in the above embodiment, counter 14 is counted down from "15". However, counter 14 may be counted up from "0". In this case, shift register 13 outputs data CSR15-0 sequentially from the LSB, and controller 18 outputs signals CUNTCK and CCCK. The arrangement shown in FIG. 1 is not changed.

Figure 10:
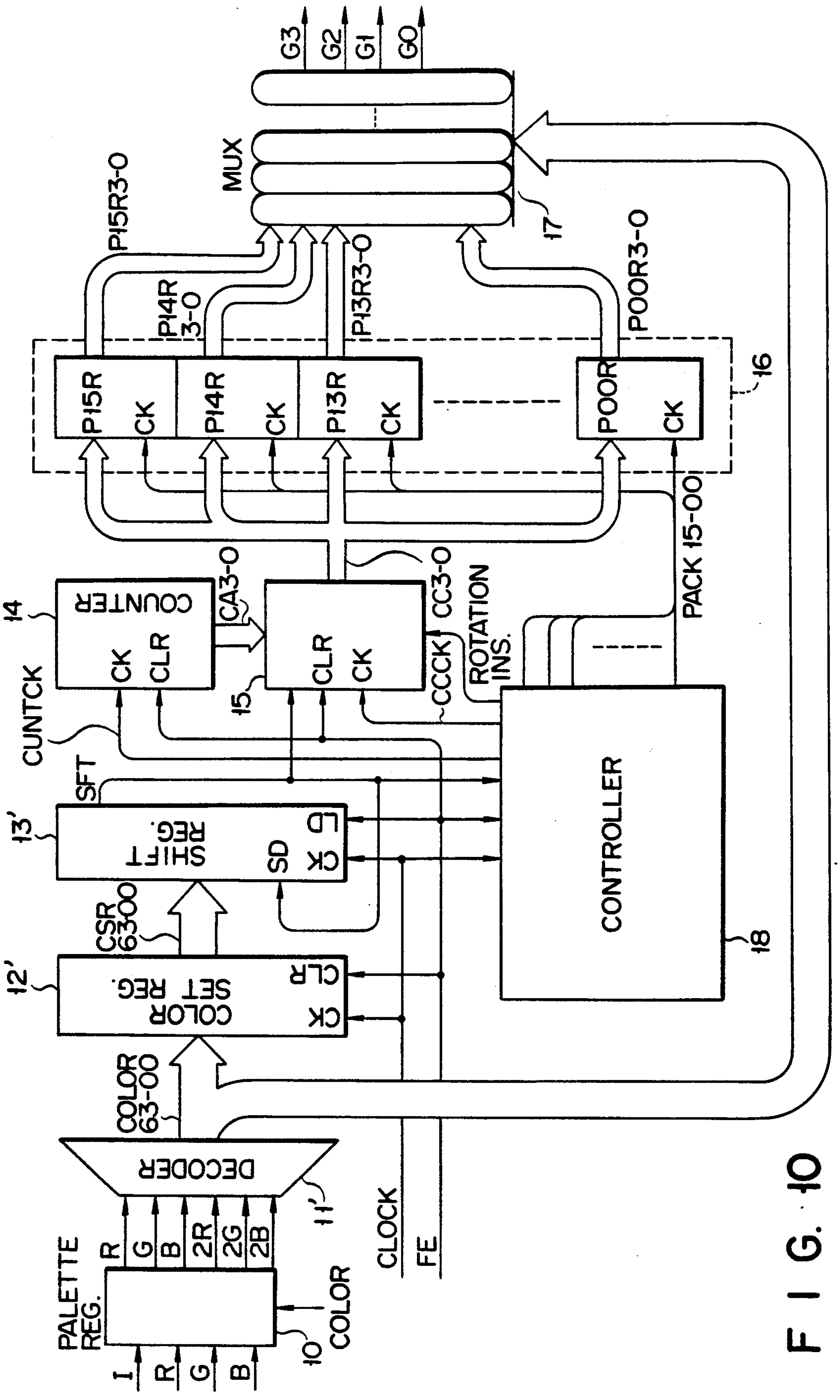
FIG. 10 is a block diagram showing an arrangement of a second embodiment of the color converting circuit according to the present invention.

A second embodiment of the present invention will be described below with reference to FIG. 10.

The second embodiment is similar to the first embodiment, and therefore only a difference therebetween will be described below.

Color codes I, R, G, and B are supplied to palette register 10. Register 10 has 16 palettes and can designate 64 colors. One color is externally designated for each palette. Color codes R, G, B, 2R, 2G, and 2B corresponding to the designated colors are output to decoder 11' in accordance with input color codes I, R, G, and B. That is, although the number of colors is changed from 16 to 64, the following operation and arrangement are similar to those of the first embodiment.

In the second embodiment, the number of colors which can be used in display of one frame is 16 although 64 colors can be used, and the number of bits to be rotated by converter 15 is the same as that in the first embodiment.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of applicant's general inventive concept.

What is claimed is:

1. An apparatus for displaying a received signal representing a frame of data on a monochrome-display, the signal having a plurality of pixels represented by color codes, comprising:

means for detecting the number of color codes occurring in one frame of display data of the signal;

means for generating rom the number a set of gradation codes having a substantially uniform difference between adjacent gradation codes, the difference being a function of the number of colors detected by the detecting means;

means for storing the set of gradation codes; and means, responsive to the signal and to the storing means, for applying a gradation code to the display in response to a color code.

2. An apparatus according to claim 1, wherein the detecting means includes means for decoding each of the color codes into a decoded color code.

3. An apparatus according to claim 2, wherein the detecting means further includes means for latching a set of decoded color codes.

4. An apparatus according to claim 3, wherein the latching means includes an n-bit latch means, and the detecting means further includes shift register means, responsive to the n-bit latch means, for shifting the set of decoded color codes including means for loading the set of decoded color codes form the n-bit latch means, and means for generating the loaded color codes sequentially from a most significant digit to lesser significant digits in a serial manner.

5. An apparatus according to claim 4, wherein the detecting means further includes color counting means for counting the number of the color codes generated by the shift register means; and means for generating an instruction signal responsive to the counted number of loaded color codes.

6. An apparatus according to claim 5, wherein the means for generating a set of codes includes means for counting down in steps from a preset n-bit value in accordance with the counted number of color codes to a counted down value.

7. An apparatus according to claim 6, wherein the means for generating a set of codes further includes means for converting a counted down value into a gradation code at each step in accordance with the instruction signal

8. An apparatus according to claim 7, wherein the converting means further includes means for rotating selectively the loaded counted down value at each step in units of bits to generate rotated values in accordance with the instruction signals, and means for applying the rotated values as the gradation codes to the storing means.

9. An apparatus according to claim 8, wherein the gradation has n levels, and the rotating means includes means for k-bit rotating the loaded counted down value when the number of colors is $m (m<n)$, k satisfying the following relation:

$$m+2^k \leq n < m+2^{k+1}$$

10. An apparatus according to claim 3, wherein the latching means includes n-bit latch means, and the detecting means further includes shift register means, responsive to the n-bit latch means, for shifting the set of decoded color codes including means for loading the set of decoded color codes from the n-bit latch means, and means for generating the loaded color codes sequentially from a least significant digit to more significant digits in a serial manner.

11. An apparatus according to claim 2, wherein the applying means includes selecting means, responsive to the storing means and having a control input responsive to the signal representing a frame of display data, for selecting a gradation code from the storing means, including means for applying the selected gradation code to the display.

12. An apparatus according to claims 11, wherein the control input is responsive to the decoding means.

13. An apparatus according to claim 1, wherein the storing means includes an n-bit register to store the gradation codes.

14. In a system for displaying a received signal representing a frame of data on a monochrome display, the signal having a plurality of pixels represented by color codes, a method of displaying the signal comprising the steps of:

detecting the number of color codes occurring in one frame of display data of the signal;

generating from the number a set of gradation codes having a substantially uniform difference between adjacent gradation codes, the difference being a function of the number of colors detected by the detecting step;

storing the set of gradation codes; and applying, responsive to the signal and to the storing step, a gradation code to the display in responsive to a color code.

15. A method according to claim 14, wherein the detecting step includes the substep of decoding each of the color codes into a decoded color code.

16. A method according to claim 15, wherein the detecting step further includes the substep of latching a set of decoded color codes.

17. A method according to claim 16, wherein the system includes an n-bit latch means and a shift register means, the latching substep employs the n-bit latch means, and the detecting step further includes the substeps of loading the set of decoded color codes rom the n-bit latch means into the shift register means, and generating the loaded color codes sequentially from a most significant digit to lesser significant digits in a serial manner.

18. A method according to claim 17, wherein the detecting step further includes the substeps of color counting the number of the color codes generated by the step of generating the loaded color codes; and generating an instruction signal responsive to the counted number of loaded color codes.

19. A method according to claim 18, wherein the step of generating a set of codes includes the substep of counting down in count-down steps from a preset n-bit value in accordance with the counted number of color codes to a counted down value.

20. A method according to claim 19, wherein the step of generating a set of codes further includes the substep of converting a counted down value into a gradation code at each count-down step in accordance with the instruction signal.

21. A method according to claim 20, wherein the converting step further includes the substep of rotating selectively the loaded counted down value at each count-down step in units of bits to generated rotated values in accordance with the instruction signals, and applying the rotated values as the gradation codes to the storing step.

22. A method according to claim 21, wherein the gradation has n levels, and the rotating step includes the substep of k-bit rotating the loaded counted down value when the number of colors is m(m<n), k satisfying the following relation:

$$m+2^k \leqq n < m+2^{k+1}$$

23. A method according to claim 16, wherein the system includes an n-bit latch means and a shift register means, the latching substep employs the n-bit latch means, and the detecting step further includes the substeps of loading the set of decoded color codes form the n-bit latch means into the shift register means, and generating the loaded color codes sequentially from a least significant digit to more significant digits in a serial manner.

24. A method according to claim 15, wherein the applying step includes the substep of selecting, responsive to the storing step and to the signal representing a frame of display data, a gradation code from the storing step, including the substep of applying the selected gradation code to the display.

25. A method according to claims 24, wherein the selecting step is responsive to the decoding step.

26. A method according to claim 14, wherein the system includes an n-bit register, and the storing step includes the substep of storing the set of gradation codes into an n-bit register.

27. A method according to claim 14, wherein the detecting step further includes the substeps of generating color codes sequentially from a most significant digit to lesser significant digits in a serial manner to produce a counted number; and generating an instruction signal responsive to the counted number.

28. A method according to claim 27, wherein the step of generating includes the substeps of counting down in count-down steps from a preset n-bit value in accordance with the counted number of color codes to a counted down value;

rotating selectively the counted down value in units of bits to generate rotated values in accordance with the instruction signals, and generating the rotated values as the gradation codes.

29. A method according to claim 28, wherein the gradation has n levels, and the rotating step includes the substep of k-bit rotating the counted down value when the number of colors is m(m<n), k satisfying the following relation:

$$m+2^k \leqq n < m+2^{k+1}.$$

30. A method according to claim 21, wherein the gradation has n levels, and the step of generating includes the substep of rotating selectively the counted down value in units of bits to generate rotated values in accordance with the instruction signals including the substep of k-bit rotating the counted down value when the number of colors is m(m<n), k satisfying the following relation:

$$m+2^k \leqq n < m+2^{k+1}$$

31. A method according to claim 14, wherein the detecting step further includes the substep of generating color codes sequentially from a least significant digit to more significant digits in a serial manner.

* * * * *

UNITED STATES PATENT AND TRADEMARK OFFICE

CERTIFICATE OF CORRECTION

PATENT NO. : 5,148,518

DATED : September 15, 1992

INVENTOR(S) : Akifumi INOUE

It is certified that error appears in the above-indentified patent and that said Letters Patent is hereby corrected as shown below:

TITLE PAGE

Abstract, line 3, after "to" insert --be--.

Claim 1, column 5, line 46, change "rom" to --from--.

Claim 4, column 6, line 2, change "form" to --from--.

Claim 7, column 6, line 22, after "signal" insert --.--.

Claim 12, column 6, line 59, change "claims" to --claim--.

Claim 14, column 7, line 10, change "responsive" to --response--.

Claim 17, column 7, line 23, change "rom" to --from--.

Claim 21, column 7, line 49, change "generated" to --generate--.

UNITED STATES PATENT AND TRADEMARK OFFICE

CERTIFICATE OF CORRECTION

PATENT NO. : 5,148,518

DATED : September 15, 1992

INVENTOR(S) : Akifumi INOUE

It is certified that error appears in the above-indentified patent and that said Letters Patent is hereby corrected as shown below:

Claim 30, column 8, line 46, change "claim 21" to --claim 27--.

Signed and Sealed this

Twenty-ninth Day of March, 1994

Attest:

BRUCE LEHMAN

Attesting Officer

*Commissioner of Patents and Trademarks*